United States Patent
Lin et al.

(10) Patent No.: US 9,445,354 B2
(45) Date of Patent: Sep. 13, 2016

(54) APPARATUS AND METHOD FOR ACQUIRING IPV6 DOMAIN NAME SYSTEM SERVER AND SIP SERVER ADDRESS

(71) Applicant: MediaTek Inc., Hsin-Chu (TW)

(72) Inventors: Kuan-Ming Lin, Hsinchu (TW);
Tsung-Chieh Chang, Taichung (TW);
Yuan-Chieh Lin, Taichung (TW);
Ming-Cong Sun, Taipei (TW);
Huang-Yi Yu, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 239 days.

(21) Appl. No.: 13/951,403

(22) Filed: Jul. 25, 2013

(65) Prior Publication Data

US 2014/0219165 A1 Aug. 7, 2014

Related U.S. Application Data

(60) Provisional application No. 61/760,942, filed on Feb. 5, 2013.

(51) Int. Cl.
*H04L 29/12* (2006.01)
*H04W 48/16* (2009.01)
*H04W 48/14* (2009.01)

(52) U.S. Cl.
CPC .......... *H04W 48/16* (2013.01); *H04L 61/2015* (2013.01); *H04L 61/6059* (2013.01); *H04L 61/1511* (2013.01); *H04W 48/14* (2013.01)

(58) Field of Classification Search
None
See application file for complete search history.

(56) References Cited

U.S. PATENT DOCUMENTS

| | | | |
|---|---|---|---|
| 2005/0117590 A1* | 6/2005 | Ronneke | 370/395.52 |
| 2009/0213792 A1* | 8/2009 | Lee | 370/328 |
| 2009/0274114 A1* | 11/2009 | Jun et al. | 370/331 |
| 2013/0089017 A1* | 4/2013 | De Smet et al. | 370/312 |
| 2013/0124711 A1* | 5/2013 | Takazoe | H04L 45/02 709/223 |
| 2013/0159482 A1* | 6/2013 | Kim et al. | 709/222 |
| 2014/0016557 A1* | 1/2014 | Savolainen et al. | 370/328 |

* cited by examiner

*Primary Examiner* — Gregory Sefcheck
*Assistant Examiner* — Jenkey Van
(74) *Attorney, Agent, or Firm* — McClure, Qualey & Rodack, LLP

(57) ABSTRACT

A mobile communications device, operating as a Mobile Terminal (MT), is provided. In the mobile communications device, a receiver is configured to receive a Router Advertisement from a service network, a processor is configured to set an O-Flag of the Router Advertisement to 1 when the O-Flag of the Router Advertisement from the service network is set to 0, and a transmitter is configured to transmit the Router Advertisement to a Terminal Equipment (TE), wherein the TE transmits a DHCPv6 INFORMATION-REQUEST message to the MT when the TE receives the Router Advertisement.

10 Claims, 9 Drawing Sheets

APPARATUS AND METHOD FOR ACQUIRING IPV6 DOMAIN NAME SYSTEM SERVER AND SIP SERVER ADDRESS

CROSS REFERENCE TO RELATED APPLICATIONS

This Application claims priority of U.S. Provisional Patent Application No. 61/760,942, filed on Feb. 5, 2013, the entirety of which is incorporated by reference herein.

BACKGROUND OF THE INVENTION

1. Field of the Invention

The invention generally relates to the acquisition of IPv6 domain name system (DNS) and Session Initiation Protocol (SIP) server addresses, and more particularly, to the acquisition of IPv6 DNS and SIP server addresses in mobile communications devices.

2. Description of the Related Art

With the explosive growth of Internet applications, more and more devices, such as personal computers, workstations, laptop computers, smart phones, and various electric appliances, require IP addresses to communicate on the Internet. This leads to a problem where the number of the commonly adopted IP addresses provided by the Internet Protocol version 4 (IPv4) may be used up. In order to accommodate the fast growing needs for IP addresses, the Internet Protocol version 6 (IPv6) has been proposed by the Internet Engineering Task Force (IETF) to solve the long-anticipated problem of IPv4 address exhaustion, and provide sufficient address space, a simplified header format, support for authentication and privacy, auto-configuration of address assignments, and new Quality-of-Service (QoS) capabilities. The IPv4 uses 32 bits for an IP address and therefore has $2^{32}$ possible addresses, while the IPv6 uses 128 bits for an address and therefore has $2^{128}$ possible addresses (approximately 340 undecillion or $3.4 \times 10^{38}$). This expansion can accommodate much more devices and users on the Internet and offer extra flexibility in allocating addresses and efficiency in routing traffic. This also relieves the need on Network Address Translation (NAT), which is widely deployed as a work around for the IPv4 address exhaustion problem. An IPv6 address is typically composed of two parts: a 64-bit network prefix (referred to herein as prefix for brevity) used for routing, and a 64-bit interface identifier used to identify a host's network interface. In general, the prefix is contained in the most significant 64 bits of the IPv6 address. The interface identifier is generated from the interface's MAC address using the modified Extended Unique Identifier -64 (EUI-64) format, assigned by the GERAN/UTRAN (GSM EDGE Radio Access Network/Universal Terrestrial Radio Access Network) Gateway GPRS Support Node(GGSN), assigned by the E-UTRAN (Evolved UTRAN) PDN Gateway (PGW), established randomly, or just assigned manually. Particularly, a dynamic IPv6 address is configured using the stateless address auto-configuration (SLAAC).

However, the Terminal Equipment (TE) may get the IPv6 address but not acquire the IPv6 DNS and/or SIP server address because the O-flag in Router Advertisement (RA) may not be set or there may not be a proper protocol to acquire the IPv6 DNS and/or SIP server address from the Mobile Terminal (MT). As a result, the Terminal Equipment (TE) may not obtain the required IPv6 DNS server address in time for analyzing the domain name and/or IPv6 SIP server address for session registration to enable VoIP or IMS service.

BRIEF SUMMARY OF THE INVENTION

Communications transmission systems and methods are provided to overcome the above mentioned problems.

An embodiment of the invention provides a mobile communications device, operating as a Mobile Terminal (MT), comprising: a receiver, configured to receive a Router Advertisement from a service network; a processor, configured to set an O-Flag of the Router Advertisement to 1 when the O-Flag of the Router Advertisement from the service network is set to 0; and a transmitter, configured to transmit the Router Advertisement to a Terminal Equipment (TE), wherein the TE transmits a Dynamic Host Configuration Protocol version 6(DHCPv6) INFORMATION-REQUEST message to the MT when the TE receives the Router Advertisement.

An embodiment of the invention provides a mobile communications device, operating as a Mobile Terminal (MT), comprising: a receiver, configured to receive a Router Advertisement from a service network; a processor, configured to reserve a set value of an O-Flag of the Router Advertisement when the O-Flag of the Router Advertisement from the service network is set to 1; and a transmitter, configured to transmit the Router Advertisement to a Terminal Equipment (TE), wherein the TE transmits a DHCPv6 INFORMATION-REQUEST message to the MT when the TE receives the Router Advertisement.

An embodiment of the invention provides a method for IPv6 DNS and/or SIP server address acquisition by a mobile communications device operating as a Mobile Terminal (MT), comprising: receiving a Router Advertisement from a service network; reserving a set value of an O-Flag of the Router Advertisement when the O-Flag of the Router Advertisement from the service network is set to 1; transmitting the Router Advertisement to a Terminal Equipment (TE); and receiving a DHCPv6 INFORMATION-REQUEST message from the TE when the TE receives the Router Advertisement.

An embodiment of the invention provides a method for IPv6 DNS and/or SIP server address acquisition by a mobile communications device operating as a Mobile Terminal (MT), comprising: receiving a Router Advertisement from a service network; reserving a set value of an O-Flag of the Router Advertisement when the O-Flag of the Router Advertisement from the service network is set to 1; transmitting the Router Advertisement to a Terminal Equipment (TE); and receiving a DHCPv6 INFORMATION-REQUEST message from the TE when the TE receives the Router Advertisement.

Other aspects and features of the invention will become apparent to those with ordinary skill in the art upon review of the following descriptions of specific embodiments of communications transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof Note that the 3GPP specifications described herein are used to teach the spirit of the invention, and the invention is not limited thereto.

Figure 1:
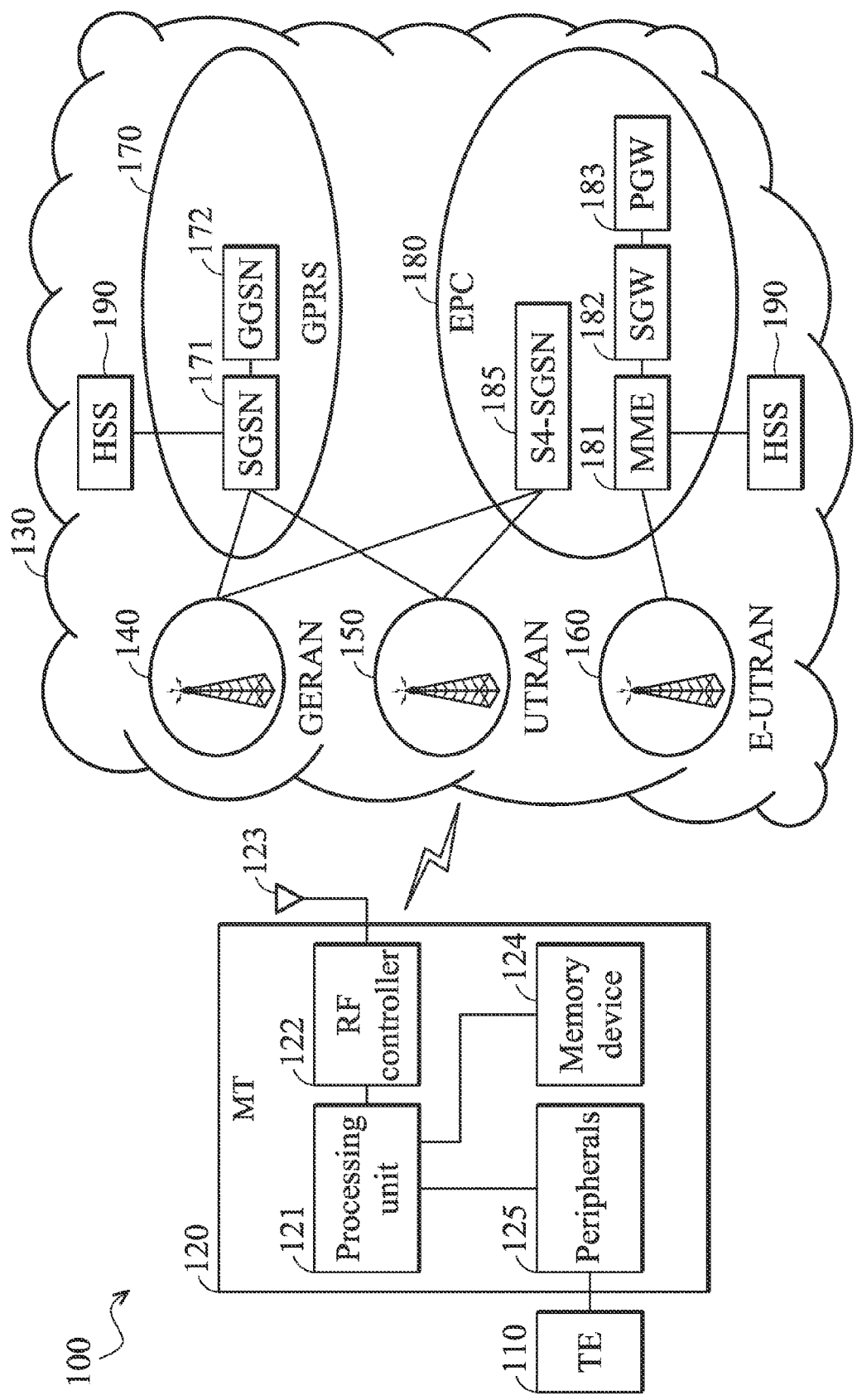
FIG. 1 is a block diagram of a mobile communications system 100 according to an embodiment of the invention.

FIG. 1 is a block diagram of a mobile communications system 100 according to an embodiment of the invention. The system 100 comprises the Terminal Equipment (TE) 110, the Mobile Terminal (MT) 120, and the service network 130, wherein the TE 110 may communicate with the service network 130 via the MT 120. The TE 110 may be a Personal Computer (PC), a laptop computer, a palmtop computer, a tablet, a smart phone application processor, or others, which provides a service platform for applications. The MT 120 may be a mobile communications device, such as a cellular phone, a smart phone modem processor, a data card, a laptop stick, a mobile hotspot, an USB modem, a tablet, or others. Specifically, the MT 120 includes a processing unit 121, a Radio Frequency (RF) controller 122, a transceiver 123, a memory device 124, and one or more peripherals 125. The RF controller 122 is coupled to the transceiver 123 and transceives wireless signals from/to the service network 130 via the transceiver 123. The peripherals 125 couple the MT 120 with the TE 110. The peripherals 125 may include a Universal Asynchronous Receiver/Transmitter (UART), a Universal Serial Bus (USB), Bluetooth, WiFi, or other means for connecting the MT 120 with external devices, e.g. the TE 110. The memory device 124 stores a series of program codes implementing the method for IPv6 DNS and/or SIP server address acquisition of the invention and the mobile communications protocol utilized for the communications between the MT 120 and the service network 130, and also stores instruction sets conforming to the architecture of the processing unit 121. The processing unit 121 may be a general-purposed processor, or a Micro-Control Unit (MCU), or others, to execute the program codes stored in the memory device 124 and control the RF controller 122 and peripherals 125. Also, the processing unit 121 may comprise a plurality of processor logics to provide the method, as proposed in the invention, for IPv6 DNS and/or SIP server address acquisition by a mobile communications device. The memory device 124 may be a volatile memory, e.g. a Random Access Memory (RAM), or a non-volatile memory, e.g. a flash memory, Read-Only Memory (ROM), or hard disk, or any combination thereof.

Please note that, although the TE 110 and the MT 120 are shown to be two separate devices, they may be incorporated into one single device. For example, the TE 110 may be implemented as one or more modules and incorporated into the MT 120, and the invention should not be limited thereto.

The service network 130 may comprise a GSM EDGE Radio Access Network (GERAN) 140, a Universal Terrestrial Radio Access Network (UTRAN) 150, an Evolved UTRAN (E-UTRAN) 160, a General Packet Radio Service (GPRS) subsystem 170 and an Evolved Packet Core (EPC) subsystem 180. The GERAN 140, UTRAN 150 and E-UTRAN 160 may be in communications with the GPRS subsystem 170 or the EPC subsystem 180, wherein the GERAN 140, UTRAN 150 and E-UTRAN 160 allow connectivity between the MT 120 and the GPRS subsystem 170 or the EPC subsystem 180 by providing the functionality of wireless transmissions and receptions to and from the MT 120 for the GPRS subsystem 170 or the EPC subsystem 180, and the GPRS subsystem 170 or the EPC subsystem 180 signals the required operation to the GERAN 140, UTRAN 150 and E-UTRAN 160 for providing wireless services to the MT 120. The GERAN 140, UTRAN 150 and E-UTRAN 160 may contain one or more base stations (or called NodeBs or eNodeBs) and Radio Network Controllers (RNCs). Specifically, the GPRS subsystem 170 includes a Serving GPRS (General Packet Radio Services) Support Node (SGSN) 171 and a Gateway GPRS Support Node (GGSN) 172, wherein the SGSN 171 is the key control node for packet routing and transfer, mobility management (e.g., attach/detach and location management), session management, logical link management, and authentication and charging functions, etc., and the GGSN 172 is responsible for Packet Data Protocol (PDP) address assignments and inter-working with external networks. The EPC subsystem 180 may comprise a Mobility Management Entity (MME) 181, which may be responsible for idle mode UE tracking, paging procedures, and attachment and activation processes. The EPC subsystem 180 may also comprise a Servicing Gateway (SGW) 182, which may be responsible for the routing and forwarding for data packets. The EPC subsystem 180 may also include a Packet data network Gateway (PGW) 183, which may be responsible for providing connectivity from the MT 120 to external networks. Both the SGSN 171 and the MME 181 may be in communications with Home Subscriber Server (HSS) 190 which may provide device identification information, an International Mobile Subscriber Identity (IMSI), etc. It should be appreciated that the EPC subsystem 180 may also comprise a S4-SGSN 185, thereby allowing the GERAN 140 or UTRAN 150 to be accessed when the GPRS subsystem 170 is replaced by the EPC subsystem 180. Additionally, the service network 130 may further include other functional entities, such as a Home Location Register (HLR) (not shown) which is a central database storing user-related and subscription-related information, and the invention is not limited thereto.

Figure 2:
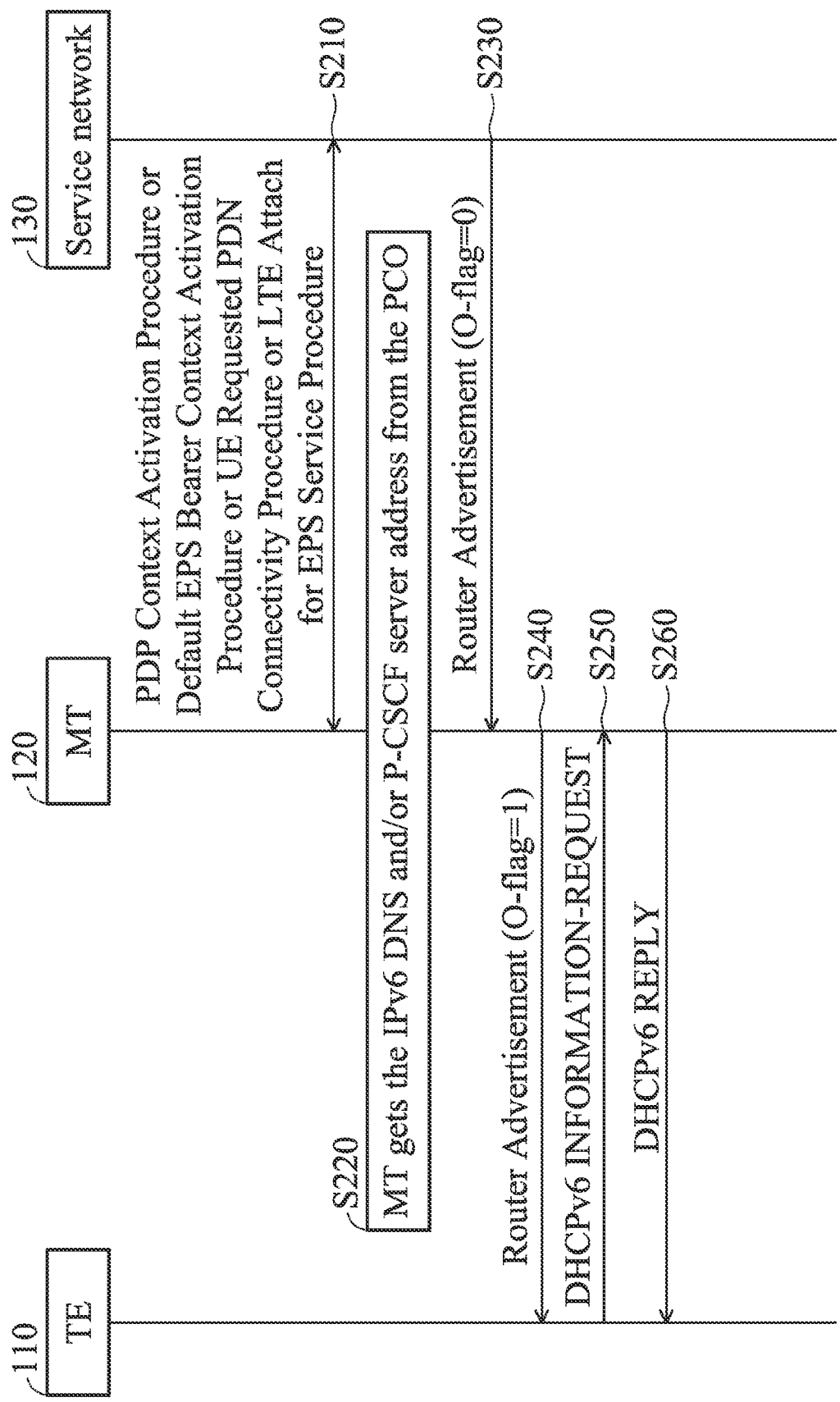
FIG. 2 is a message sequence chart illustrating the acquisition of the IPv6 DNS and/or SIP server address in a mobile communications system according to a first embodiment of the invention.

FIG. 2 is a message sequence chart illustrating the acquisition of the IPv6 DNS and/or SIP server address in a mobile communications system according to a first embodiment of the invention. As shown in FIG. 2, the MT 120 and service network 130 initiates PDP Context Activation Procedure through the Activate PDP Context Request/Activate PDP Context Accept message (step S210). Specifically, the Activate PDP Context Request/Activate PDP Context Accept message may contain various parameters, such as the information concerning the requested Access Point Name (APN), PDP type, and Protocol Configuration Options (PCO), etc., each of which is contained in a corresponding Information Element (IE) of the Activate PDP Context Request/Activate PDP Context Accept message. The APN is a logical name referring to the external packet data network or a service that the subscriber wishes to connect to, and the TE 110 or the MT 120 may use the APN to select a reference point to a certain external network or to select a service. The PDP type is set to a value representing "IPv6" or "IPv4v6". The PCO may include negotiated Authentication Protocol data. The PCO may include negotiated Network Control Protocol data. Note that no illustrations of the detailed steps of the activation of the PDP Context in FIG. 2 are provided, because the steps of the activation of PDP Context are common technology in the art. In this embodiment, in the step 210, the MT 120 and service network 130 may also initiate Default Evolved Packet System (EPS) Bearer Context Activation Procedure or UE Requested Packet Data Network (PDN) Connectivity Procedure or LTE Attach for EPS Service Procedure. The Default EPS Bearer Context Activation Procedure is initiated through the ACTIVATE DEFAULT EPS BEARER CONTEXT REQUEST message for receiving the information of the PCO, wherein the ACTIVATE DEFAULT EPS BEARER CONTEXT REQUEST message can include the following information elements (IEs): Protocol Discriminator, EPS bearer identity, Procedure transaction identity, Activate Default EPS Bearer Context Request message identity, EPS QoS, Access Point Name (APN) and PDN Address. When the PDP Context Activation Procedure or Default EPS Bearer Context Activation Procedure or UE Requested PDN Connectivity Procedure or LTE Attach for EPS Service Procedure is activated, the MT 120 may get the IPv6 DNS and/or Proxy-Call Session Control Function (P-CSCF) server address from the PCO (step S220). Note that P-CSCF server is a kind of SIP server that is the first point of contact for an IMS (IP Multimedia Subsystem) terminal. It can be located either in a visited network or in a home network. The P-CSCF is assigned to an IMS terminal during registration, and does not change for the duration of the registration. It sits on the path of all signaling messages, and can inspect every message. It further authenticates the user and establishes a security association with the IMS terminal. Currently the P-CSCF discovery specified in the 3GPP standard and the P-CSCF discovery Request and provision of P-CSCF addresses in the PCO in the session management procedures. In this embodiment, some IPv6 DNS and/or SIP server addresses may be pre-stored in the non-volatile memory of the MT 120, therefore the MT 120 may also get the IPv6 DNS and/or SIP server address from the non-volatile memory. When an O-Flag of the Router Advertisement from the service network 130 is set to 0 (step S230), the MT 120 may set the O-Flag of the Router Advertisement to 1 and transmit the Router Advertisement (O-Flag =1) to the TE 110 (step S240). Specifically, the O-Flag of the Router Advertisement being set to 1 means that the service network 130 has a DHCPv6 server and the O-Flag of the Router Advertisement being set to 0 means that the service network 130 does not have a DHCPv6 server. When the TE 110 receives the Router Advertisement (O-Flag =1), the TE 110 may transmit a DHCPv6 INFORMATION-REQUEST message to the MT 120 (step S250). Note that, if the O-Flag of the Router Advertisement is set to 0, the TE 110 may not transmit a DHCPv6 INFORMATION-REQUEST message to the MT 120. When the MT 120 receives the DHCPv6 INFORMATION-REQUEST message from the TE 110, the MT 120 may transmit a DHCPv6 REPLY message to the TE 110 according to the IPv6 DNS and/or P-CSCF server address from the PCO and /or the IPv6 DNS and/or SIP server address from the non-volatile memory (step S260). Specifically, if the IPv6 DNS and/or P-CSCF server address from the PCO is sufficient and needed by a user, the MT 120 may transmit a DHCPv6 REPLY message to the TE 110 only according to the IPv6 DNS and/or P-CSCF server address from the PCO. However, if the IPv6 DNS and/or P-CSCF server address from the PCO is not sufficient and needed by the user, the MT 120 may transmit a DHCPv6 REPLY message to the TE 110 further according to the IPv6 DNS and/or SIP server address from the non-volatile memory.

Figure 3:
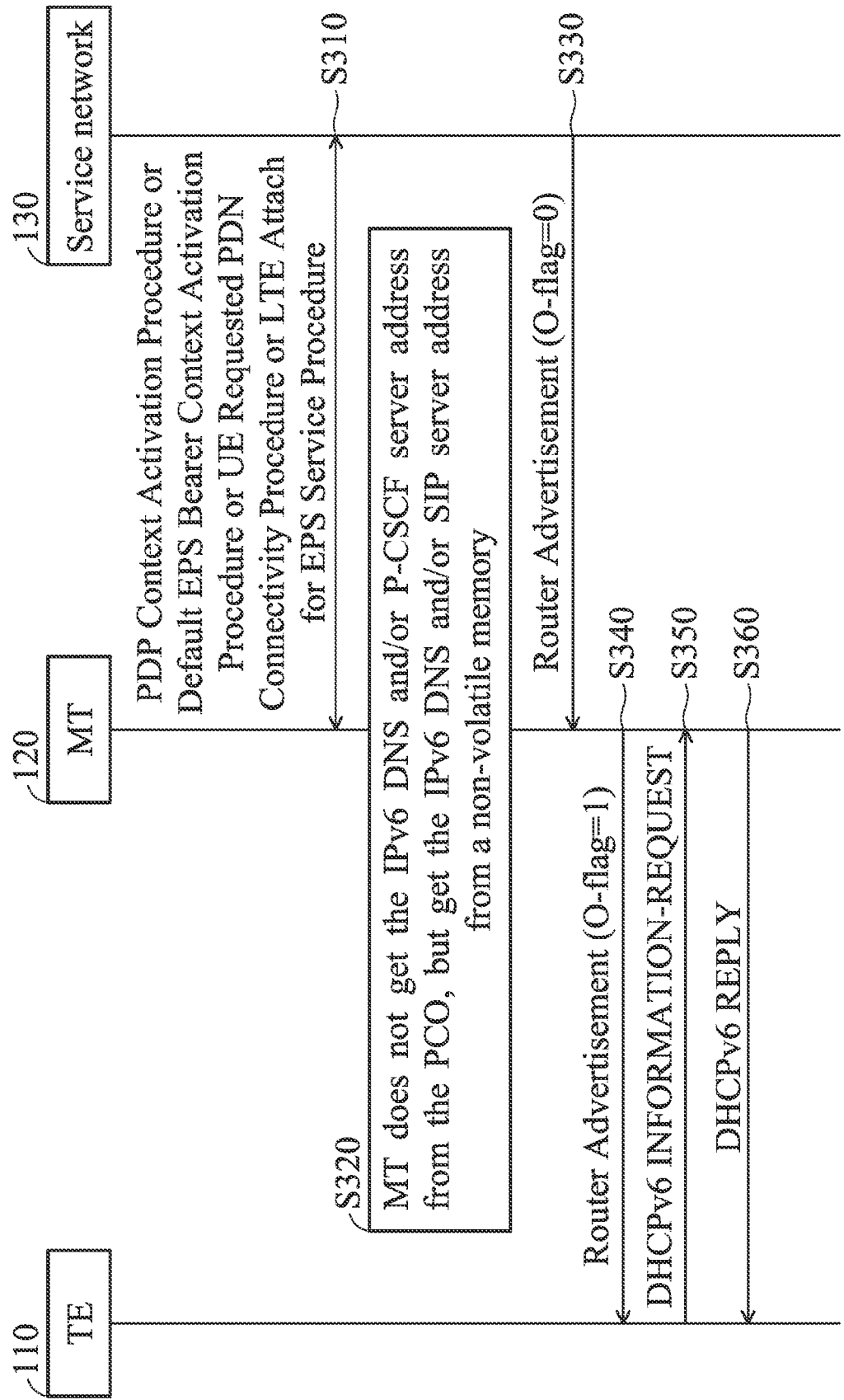
FIG. 3 is a message sequence chart illustrating the acquisition of the IPv6 DNS and/or SIP server address in a mobile communications system according to a second embodiment of the invention.

FIG. 3 is a message sequence chart illustrating the acquisition of the IPv6 DNS and/or SIP server address in a mobile communications system according to a second embodiment of the invention. As shown in FIG. 3, the MT 120 and service network 130 initiates PDP Context Activation Procedure through the Activate PDP Context Request message/Activate PDP Context Accept message (step S310). In this embodiment, in the step 310, the MT 120 and service network 130 may initiate Default Evolved Packet System (EPS) Bearer Context Activation Procedure or UE Requested Packet Data Network (PDN) Connectivity Procedure or LTE Attach for EPS Service Procedure. The Default EPS Bearer Context Activation Procedure is initiated through the ACTIVATE DEFAULT EPS BEARER CONTEXT REQUEST message for receiving the information of the PCO, wherein the ACTIVATE DEFAULT EPS BEARER CONTEXT REQUEST message can include the following information elements (IEs): Protocol Discriminator, EPS bearer identity, Procedure transaction identity, Activate Default EPS Bearer Context Request message identity, EPS QoS, Access Point Name (APN) and PDN Address. When the PDP Context Activation Procedure or Default EPS Bearer Context Activation Procedure or UE Requested PDN Connectivity Procedure or LTE Attach for EPS Service Procedure is activated and the MT 120 is not able to get the IPv6 DNS and/or P-CSCF server address from the PCO, the MT 120 may get the IPv6 DNS and/or SIP server address from a non-volatile memory having pre-stored IPv6 DNS and/or SIP server addresses (step S320). When the O-Flag of the Router Advertisement from the service network 130 is set to 0 (step S330), the MT 120 may set an O-Flag of the Router Advertisement to 1 and transmit the Router Advertisement (O-Flag=1) to the TE 110 (step S340). When the TE 110 receive the Router Advertisement (O-Flag=1), and the TE 110 may transmit a DHCPv6 INFORMATION-REQUEST message to the MT 120 (step S350). When the MT 120 receives the DHCPv6 INFORMATION-REQUEST message from the TE 110, the MT 120 may transmit a DHCPv6 REPLY message to the TE 110 according to the IPv6 DNS and/or SIP server address from the non-volatile memory (step S360).

Figure 4:
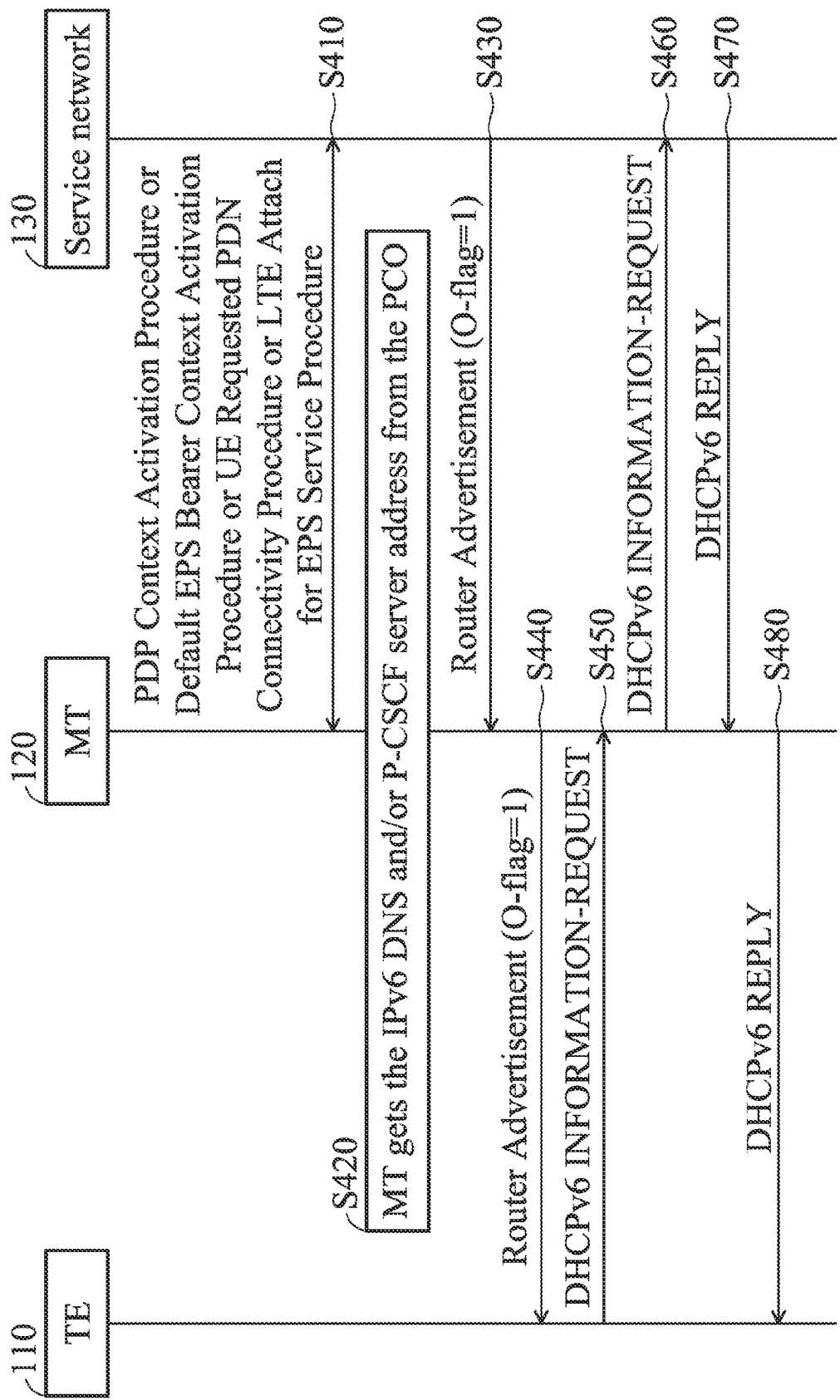
FIG. 4 is a message sequence chart illustrating the acquisition of the IPv6 DNS and/or SIP server address in a mobile communications system according to a third embodiment of the invention.

FIG. 4 is a message sequence chart illustrating the acquisition of the IPv6 DNS and/or SIP server address in a mobile communications system according to a third embodiment of the invention. As shown in FIG. 4, the MT 120 and service network 130 initiates PDP Context Activation Procedure through the Activate PDP Context Request message/Activate PDP Context Accept message (step S410). In this embodiment, in the step 410, the MT 120 and service network 130 may initiate Default Evolved Packet System (EPS) Bearer Context Activation Procedure or UE Requested Packet Data Network (PDN) Connectivity Procedure or LTE Attach for EPS Service Procedure. The Default EPS Bearer Context Activation Procedure is initiated through the ACTIVATE DEFAULT EPS BEARER CONTEXT REQUEST message for receiving the information of the PCO, wherein the ACTIVATE DEFAULT EPS BEARER CONTEXT REQUEST message can include the following information elements (IEs): Protocol Discriminator, EPS bearer identity, Procedure transaction identity, Activate Default EPS Bearer Context Request message identity, EPS QoS, Access Point Name (APN) and PDN Address. When the PDP Context Activation Procedure or Default EPS Bearer Context Activation Procedure or UE Requested PDN Connectivity Procedure or LTE Attach for EPS Service Procedure is activated, the MT 120 may get the IPv6 DNS and/or P-CSCF server address from the PCO, (step S420). Note that P-CSCF server is a kind of SIP server that is the first point of contact for an IMS terminal Currently the P-CSCF discovery specified in the 3GPP standard and the P-CSCF discovery Request and provision of P-CSCF addresses in the PCO in the session management procedures. In this embodiment, some IPv6 DNS and/or SIP server addresses may be pre-stored in the non-volatile memory of the MT 120 therefore the MT 120 may also get the IPv6 DNS and/or SIP server address from the non-volatile memory. When the O-Flag of the Router Advertisement from the service network 130 is set to 1 (step S430), the MT 120 may reserve the set of an O-Flag of the Router Advertisement (i.e. O-Flag=1) and transmit the Router Advertisement (O-Flag=1) to the TE 110 (step S440). When the TE 110 receives the Router Advertisement (O-Flag=1), the TE 110 may transmit a DHCPv6 INFORMATION-REQUEST message to the MT 120 (step S450). Then the MT 120 may transmit the DHCPv6 INFORMATION-REQUEST message to the service network 130 (step S460). When the service network 130 receives the DHCPv6 INFORMATION-REQUEST message from the MT 120, the service network 130 may transmit a DHCPv6 REPLY message to the MT 120 (step S470). Then the MT 120 may transmit a DHCPv6 REPLY message to the TE 110 (step S480). In this embodiment, the MT 120 may modify the DHCPv6 REPLY message transmitted from the service network 130 according to the IPv6 DNS and/or P-CSCF server address from the PCO and/or the pre-stored IPv6 DNS and/or SIP server addresses from the non-volatile memory, before transmitting the DHCPv6 REPLY message to the TE 110. Specifically, if the IPv6 DNS and/or SIP server address from the DHCPv6 REPLY message transmitted from the service network 130 is sufficient and needed by a user, the MT 120 may transmit the DHCPv6 REPLY message to the TE 110. However, if the IPv6 DNS and/or SIP server address from the DHCPv6 REPLY message transmitted from the service network 130 is not sufficient and needed by the user, the MT 120 may modify the DHCPv6 REPLY message according to the IPv6 DNS and/or P-CSCF server address from the PCO and/or the IPv6 DNS and/or SIP server address from the non-volatile memory and transmitted the modified DHCPv6 REPLY message to the TE 110.

Figure 5:
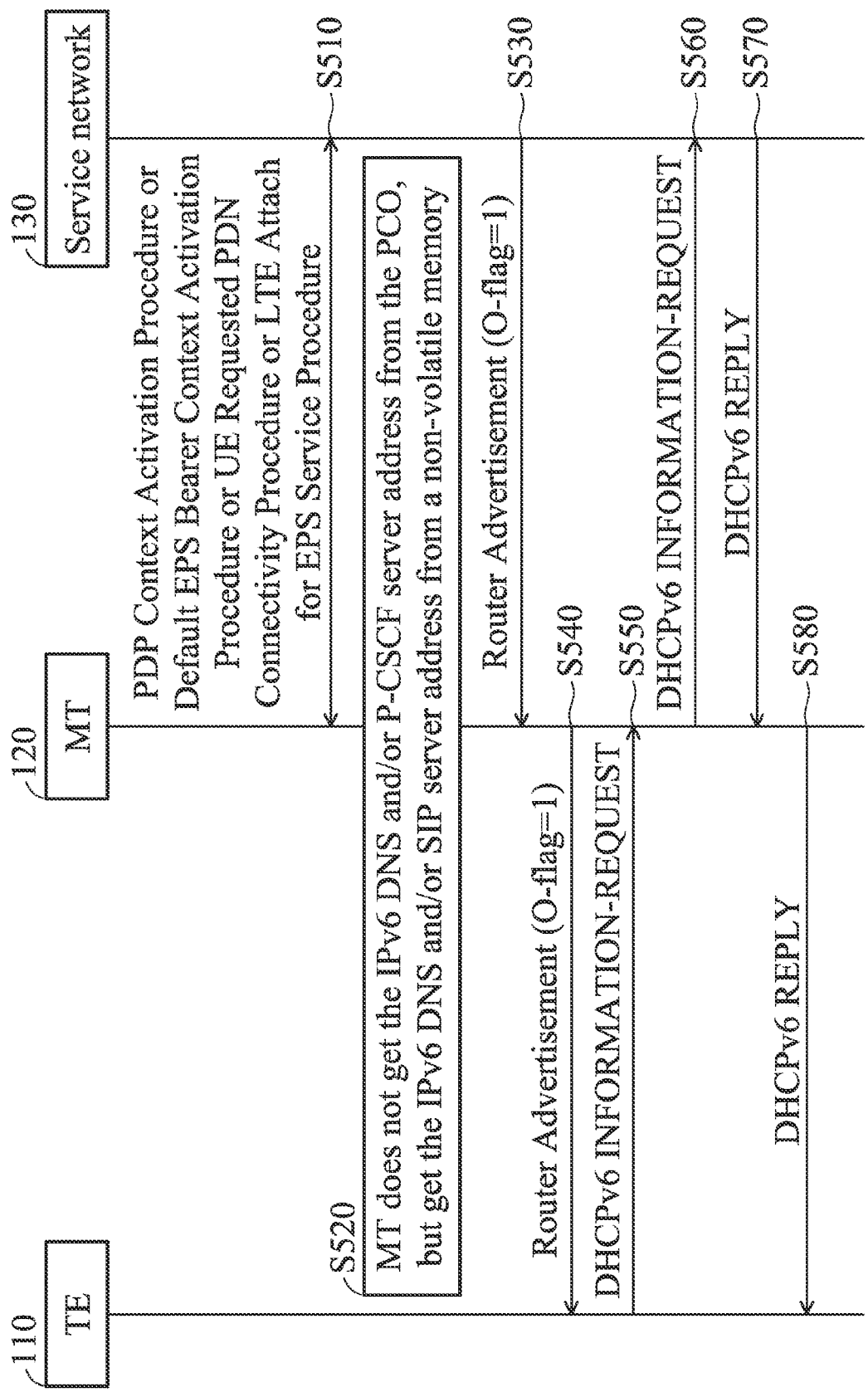
FIG. 5 is a message sequence chart illustrating the acquisition of the IPv6 DNS and/or SIP server address in a mobile communications system according to a fourth embodiment of the invention.
Figure 6A:
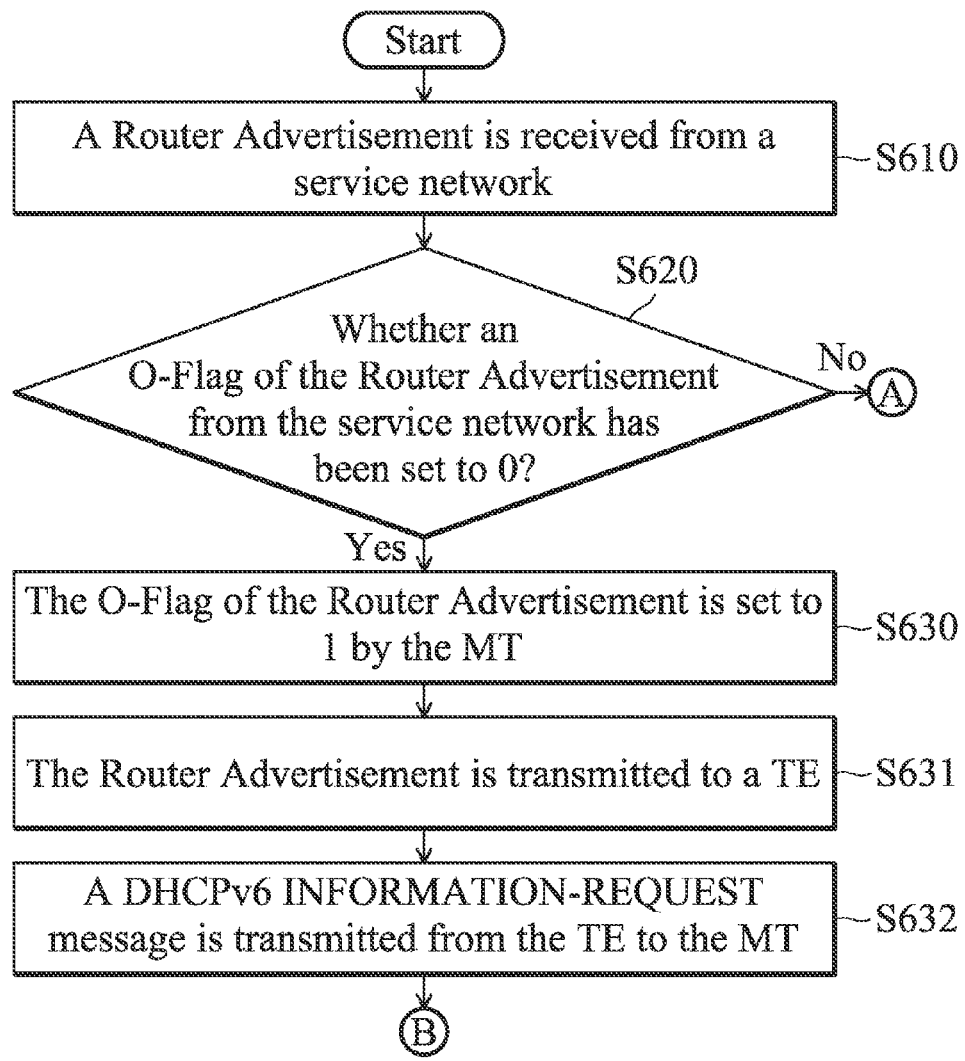
FIG. 6A-6D is a flow chart illustrating the method for IPv6 address acquisition by a mobile communications device operating as a Mobile Terminal (MT) according to an embodiment of the invention.
Figure 6A:
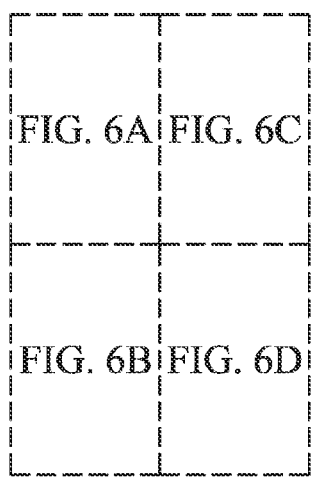
Figure 6B:
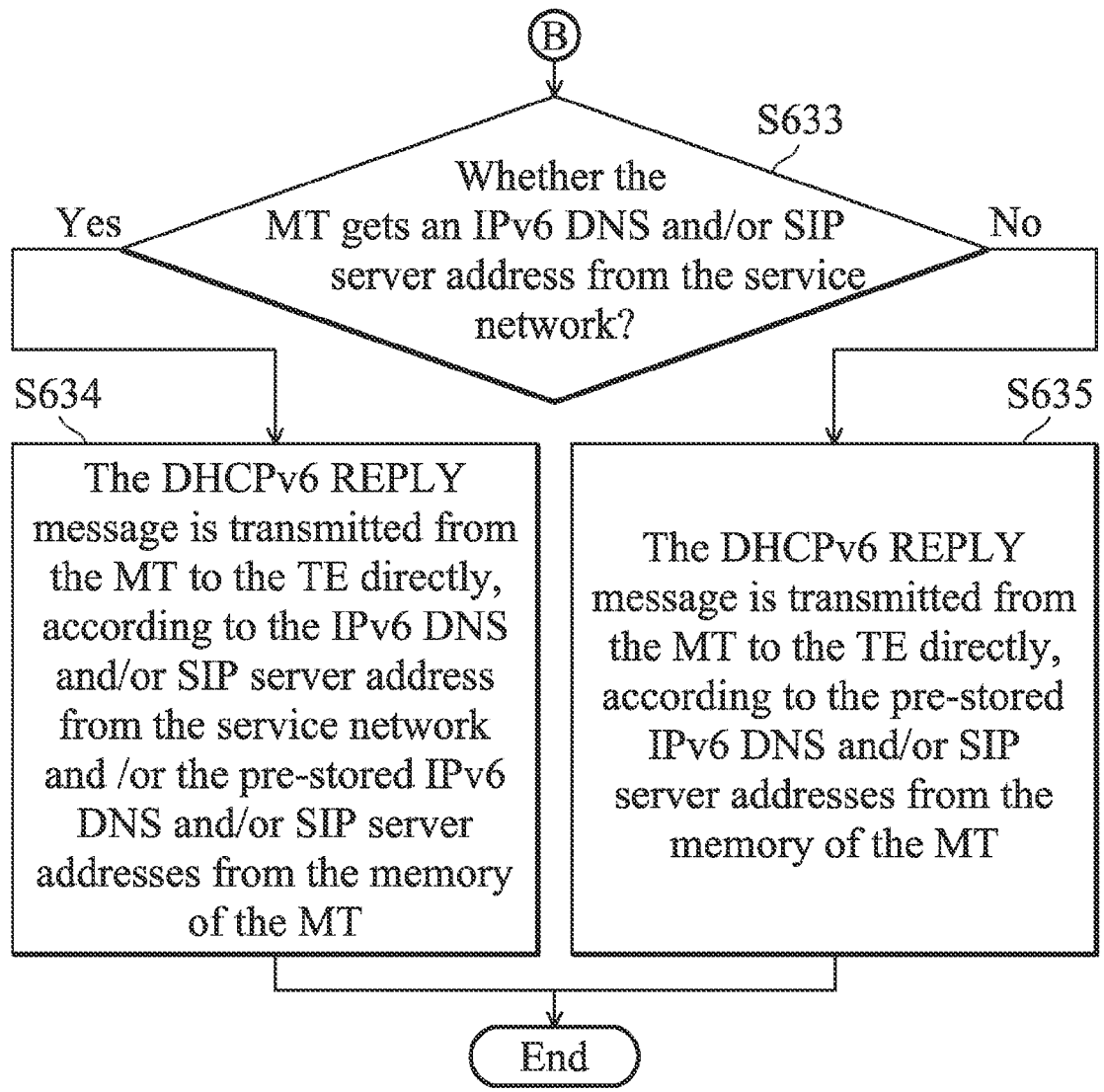
Figure 6C:
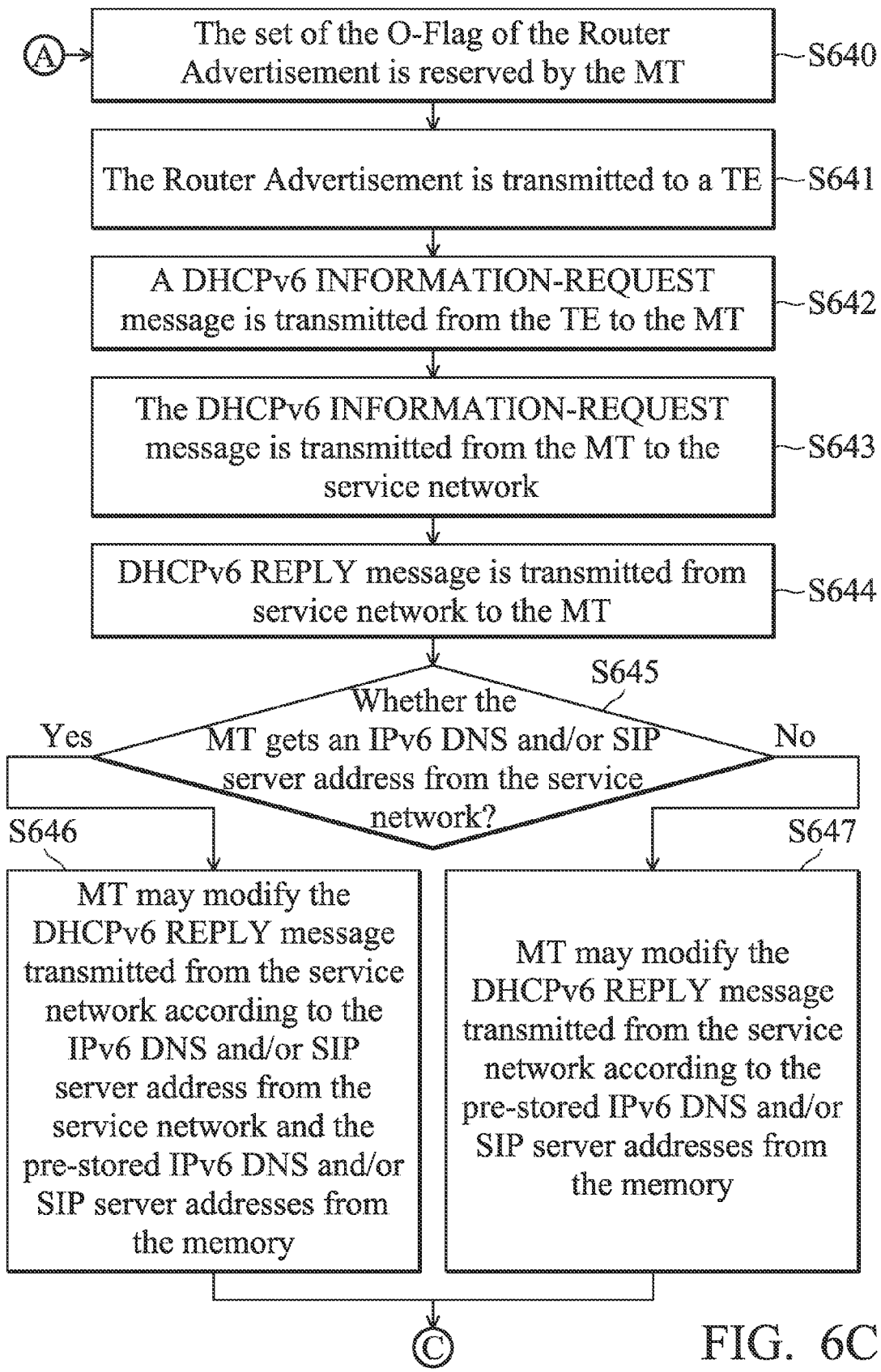
Figure 6D:
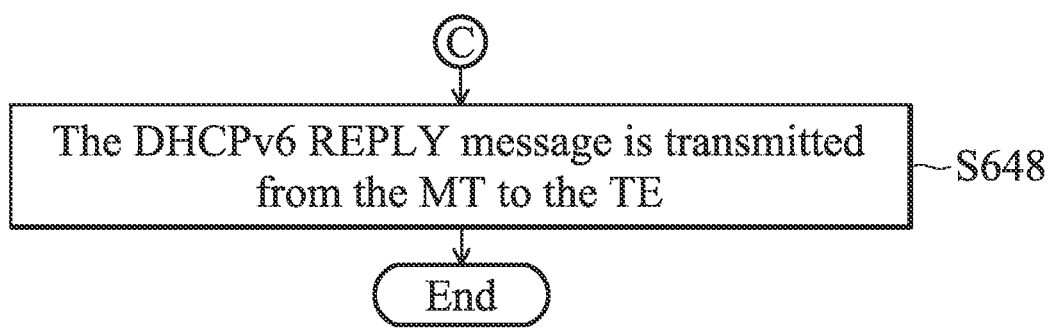

FIG. 5 is a message sequence chart illustrating the acquisition of the IPv6 DNS and/or SIP server address in a mobile communications system according to a fourth embodiment of the invention. As shown in FIG. 5, the MT 120 and service network 130 initiates PDP Context Activation Procedure through the Activate PDP Context Request message/ Activate PDP Context Accept message (step S510). In this embodiment, in the step 510, the MT 120 and service network 130 may initiate Default Evolved Packet System (EPS) Bearer Context Activation Procedure or UE Requested Packet Data Network (PDN) Connectivity Procedure or LTE Attach for EPS Service Procedure. The Default EPS Bearer Context Activation Procedure is initiated through the ACTIVATE DEFAULT EPS BEARER CONTEXT REQUEST message for receiving the information of the PCO, wherein the ACTIVATE DEFAULT EPS BEARER CONTEXT REQUEST message can include the following information elements (IEs): Protocol Discriminator, EPS bearer identity, Procedure transaction identity, Activate Default EPS Bearer Context Request message identity, EPS QoS, Access Point Name (APN) and PDN Address. When the PDP Context Activation Procedure or Default EPS Bearer Context Activation Procedure or UE Requested PDN Connectivity Procedure or LTE Attach for EPS Service Procedure is activated and the MT 120 is not able to get the IPv6 DNS and/or P-CSCF server address from the PCO, the MT 120 may get the IPv6 DNS and/or SIP server address from the non-volatile memory having pre-stored IPv6 DNS and/or SIP server addresses (step S520). When the O-Flag of the Router Advertisement from the service network 130 is set to 1 (step S530), the MT 120 may reserve the set of an O-Flag of the Router Advertisement (i.e. O-Flag=1) and transmit the Router Advertisement (O-Flag=1) to the TE 110 (step S540). When the TE 110 receives the Router Advertisement (O-Flag=1), the TE 110 may transmit a DHCPv6 INFORMATION-REQUEST message to the MT 120 (step S550). Then the MT 120 may transmit the DHCPv6 INFORMATION-REQUEST message to the service network 130 (step S560). When the service network 130 receives the DHCPv6 INFORMATION-REQUEST message from the MT 120, the service network 130 may transmit a DHCPv6 REPLY message to the MT 120 (step S570). Then the MT 120 may transmit a DHCPv6 REPLY message to the TE 110 (step S580). In this embodiment, the MT 120 may modify the DHCPv6 REPLY message transmitted from the service network 130 according to the pre-stored IPv6 DNS and/or SIP server addresses from the non-volatile memory, before transmitting the DHCPv6 REPLY message to the TE 110.

FIG. 6A-6D is a flow chart illustrating the method for IPv6 address acquisition by a mobile communications device operating as a Mobile Terminal (MT) according to an embodiment of the invention. Firstly, in step S610, a Router Advertisement is received from a service network. Then, in step S620, it is determined whether an O-Flag of the Router Advertisement from the service network has been set to 0. If the O-Flag of the Router Advertisement from the service network has been set to 0, the O-Flag of the Router Advertisement is set to 1 by the MT (step S630). If the O-Flag of the Router Advertisement from the service network has been set to 1, the set of the O-Flag of the Router Advertisement is reserved by the MT (step S640).

After the step S630, in the step S631, the Router Advertisement is transmitted to a Terminal Equipment (TE). In the step S632, a DHCPv6 INFORMATION-REQUEST message is transmitted from the TE to the MT when the TE receives the Router Advertisement. In the step S633, the MT may determine whether the MT gets an IPv6 DNS and/or SIP server address from the service network. If the MT gets an IPv6 DNS and/or SIP server address from the service network, a DHCPv6 REPLY message is transmitted from the MT to the TE directly, according to the IPv6 DNS and/or SIP server address from the service network and /or the pre-stored IPv6 DNS and/or SIP server addresses from the memory of the MT (step 634). If the MT is not able to get an IPv6 DNS and/or SIP server address from the service network, a DHCPv6 REPLY message is transmitted from the MT to the TE directly, according to the pre-stored IPv6 DNS and/or SIP server addresses from the memory of the MT (step S635).

After the step S640, in the step S641, the Router Advertisement is transmitted to a Terminal Equipment (TE). In the step S642, a DHCPv6 INFORMATION-REQUEST message is transmitted from the TE to the MT when the TE receives the Router Advertisement. In the step S643, the DHCPv6 INFORMATION-REQUEST message is transmitted from the MT to the service network. In the step S644 a DHCPv6 REPLY message is transmitted from service network to the MT. In the step S645, the MT may determine whether the MT gets an IPv6 DNS and/or SIP server address from the service network. If the MT gets an IPv6 DNS and/or SIP server address from the service network, the MT may modify the DHCPv6 REPLY message transmitted from the service network according to the IPv6 DNS and/or SIP server address from the service network and the pre-stored IPv6 DNS and/or SIP server addresses from the memory (step 646). If the MT is not able to get an IPv6 DNS and/or SIP server address from the service network, MT may modify the DHCPv6 REPLY message transmitted from the service network according to the pre-stored IPv6 DNS and/or SIP server addresses from the memory (step S647). In the step S648, the DHCPv6 REPLY message is transmitted from the MT to the TE.

Therefore, in the method the Terminal Equipment (TE) may get the IPv6 DNS and/or SIP server address when the O-flag of Router Advertisement (RA) message is not set or there is no IPv6 DNS and/or SIP server address reply packet from a service network.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile communications device, operating as a Mobile Terminal (MT), comprising:
    a receiver, configured to receive a Router Advertisement from a service network;
    a processor, configured to set an O-Flag of the Router Advertisement to 1 when the MT gets at least one of an IPv6 DNS or a SIP server address and the O-Flag of the Router Advertisement from the service network is set to 0; and
    a transmitter, configured to transmit the Router Advertisement to a Terminal Equipment (TE),
    wherein the receiver receives a DHCPv6 INFORMATION-REQUEST message from the TE after transmitting the Router Advertisement; and
    wherein the MT transmits a DHCPv6 REPLY message to the TE according to at least one of the IPv6 DNS or the SIP server address from the service network or the pre-stored IPv6 DNS or the SIP server addresses from a memory.

2. The mobile communications device of claim 1, wherein the memory is configured to store at least one of the pre-stored IPv6 domain name system (DNS) or the SIP server addresses.

3. The mobile communications device of claim 2, wherein the MT transmits a DHCPv6 REPLY message to the TE according to at least one of the pre-stored IPv6 DNS or the SIP server addresses from the memory.

4. A mobile communications device, operating as a Mobile Terminal (MT), comprising:
    a receiver, configured to receive a Router Advertisement from a service network;
    a processor, configured to reserve a set value of an O-Flag of the Router Advertisement when the MT gets at least one of an IPv6 DNS or a SIP server address and the O-Flag of the Router Advertisement from the service network is set to 1; and
    a transmitter, configured to transmit the Router Advertisement to a Terminal Equipment (TE),
    wherein the receiver receives a DHCPv6 INFORMATION-REQUEST message from the TE after transmitting the Router Advertisement; and
    wherein the MT transmits the DHCPv6 INFORMATION-REQUEST message to the service network and transmits a DHCPv6 REPLY message to the TE, and wherein the MT may modify the DHCPv6 REPLY message transmitted from the service network according to at least one of the IPv6 DNS or SIP server address from the service network and the pre-stored IPv6 DNS or SIP server addresses from a memory, before transmitting the DHCPv6 REPLY message to the TE.

5. The mobile communications device of claim 4, wherein the memory is configured to store at least one of the pre-stored IPv6 DNS or SIP server addresses.

6. The mobile communications device of claim 5, wherein the MT transmits the DHCPv6 INFORMATION-REQUEST message to the service network and transmits a DHCPv6 REPLY message to the TE, and wherein the MT may modify the DHCPv6 REPLY message transmitted from the service network according to at least one of the pre-stored IPv6 DNS or the SIP server addresses from the memory, before transmitting the DHCPv6 REPLY message to the TE.

7. A method for at least one of an IPv6 DNS or a SIP server address acquisition by a mobile communications device operating as a Mobile Terminal (MT), comprising:
- receiving a Router Advertisement from a service network;
- setting an O-Flag of the Router Advertisement to 1 when the MT gets at least one of an IPv6 DNS or a SIP server address and the O-Flag of the Router Advertisement from the service network is set to 0;
- transmitting the Router Advertisement to a Terminal Equipment (TE);
- receiving a DHCPv6 INFORMATION-REQUEST message from the TE after transmitting the Router Advertisement;
- storing at least one of pre-stored IPv6 domain name system (DNS) or SIP server addresses in a memory; and
- transmitting a DHCPv6 REPLY message from the MT to the TE according to at least one of the IPv6 DNS or SIP server address from the service network and the pre-stored IPv6 DNS or SIP server addresses from the memory.

8. The method of claim 7, further comprising: transmitting a DHCPv6 REPLY message from the MT to the TE according to the pre-stored IPv6 DNS or SIP server addresses from the memory.

9. A method for at least one of an IPv6 DNS or an SIP server address acquisition by a mobile communications device operating as a Mobile Terminal (MT), comprising:
- receiving a Router Advertisement from a service network;
- reserving a set value of an O-Flag of the Router Advertisement when the MT gets an IPv6 DNS or SIP server address and the O-Flag of the Router Advertisement from the service network is set to 1;
- transmitting the Router Advertisement to a Terminal Equipment (TE); and
- receiving a DHCPv6 INFORMATION-REQUEST message from the TE after transmitting the Router Advertisement;
- storing at least one of a pre-stored IPv6 domain name system (DNS) or a SIP server addresses in a memory; and
- transmitting the DHCPv6 INFORMATION-REQUEST message from the MT to the service network and transmitting a DHCPv6 REPLY message transmitted to the TE, wherein the MT may modify the DHCPv6 REPLY message transmitted from the service network according to at least one of the IPv6 DNS or the SIP server address from the service network and the pre-stored IPv6 DNS or the SIP server addresses from the memory, before transmitting the DHCPv6 REPLY message to the TE.

10. The method of claim 9, further comprising: transmitting the DHCPv6 INFORMATION-REQUEST message from the MT to the service network and transmitting a DHCPv6 REPLY message to the TE, wherein the MT may modify the DHCPv6 REPLY message transmitted from the service network according to the pre-stored IPv6 DNS and/or SIP server addresses from the memory, before transmitting the DHCPv6 REPLY message to the TE.

* * * * *